United States Patent
Hsu et al.

(10) Patent No.: US 8,868,043 B1
(45) Date of Patent: Oct. 21, 2014

(54) CALL INTERCEPTION FEATURE PERMITTING SUBSCRIBERS TO SEND CUSTOMIZABLE MESSAGES TO CALLERS

(75) Inventors: Jay Hsu, Brook, NJ (US); Yu Yin, Basking Ridge, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 1210 days.

(21) Appl. No.: 12/239,075

(22) Filed: Sep. 26, 2008

(51) Int. Cl.
*H04L 12/58* (2006.01)
*H04M 3/42* (2006.01)

(52) U.S. Cl.
USPC ............... 455/412.1; 455/414.1; 379/210.01

(58) Field of Classification Search
CPC  H04M 1/663; H04M 1/6505; H04M 2250/12
USPC .............. 455/400, 412, 414.1, 466, 401; 379/88.23, 211.01, 210, 210.22
See application file for complete search history.

(56) References Cited

U.S. PATENT DOCUMENTS

| | | | |
|---|---|---|---|
| 5,060,255 A | 10/1991 | Brown | |
| 5,467,388 A | 11/1995 | Redd, Jr. et al. | |
| 5,699,407 A | 12/1997 | Nguyen | |
| 6,021,190 A | 2/2000 | Fuller et al. | |
| 6,347,225 B1 * | 2/2002 | Nishiyama | 455/412.1 |
| 6,545,589 B1 * | 4/2003 | Fuller et al. | 340/7.22 |
| 6,574,335 B1 | 6/2003 | Kalmanek et al. | |
| 7,027,579 B1 | 4/2006 | McDonald et al. | |
| 7,352,854 B1 | 4/2008 | Silver | |
| 7,877,084 B2 * | 1/2011 | Martin et al. | 455/414.1 |
| 2002/0183048 A1 | 12/2002 | Takeuchi | |
| 2004/0120494 A1 * | 6/2004 | Jiang et al. | 379/210.01 |
| 2004/0132435 A1 | 7/2004 | No et al. | |
| 2005/0096006 A1 * | 5/2005 | Chen et al. | 455/400 |
| 2006/0078105 A1 * | 4/2006 | Korn et al. | 379/210.02 |
| 2006/0104429 A1 * | 5/2006 | Wouterse et al. | 379/210.01 |
| 2008/0298575 A1 * | 12/2008 | Rondeau et al. | 379/211.01 |

* cited by examiner

*Primary Examiner* — Kent Chang
*Assistant Examiner* — Kuo Woo (57) ABSTRACT

A telephone call processing arrangement establishes a path between a called switching center and call feature server in response to receipt of an incoming call to a subscriber. A predetermined message is transmitted from the call feature server, and the incoming call is disconnected with out extending a call leg to the subscriber. Such provision may be employed for a mobile or landline subscriber.

21 Claims, 4 Drawing Sheets

Prior Art

Fig. 5

CALL INTERCEPTION FEATURE PERMITTING SUBSCRIBERS TO SEND CUSTOMIZABLE MESSAGES TO CALLERS

TECHNICAL FIELD

The present disclosure relates to a telecommunications service, more particularly in the provision of a call interception feature.

BACKGROUND

For a mobile station subscriber that subscribes to and activates a do not disturb service on a mobile communication network, any calling party that places a telephone call to such subscriber will typically hear a fast busy signal. On the other hand, the mobile station of the subscriber will not ring or otherwise notify the subscriber of an incoming call because a mobile communication network does not establish a connection between the calling party and the subscriber when the feature is active. Instead, the communication network determines that the subscriber has activated the do not disturb service feature and plays the fast busy signal to the calling party.

Figure 5:
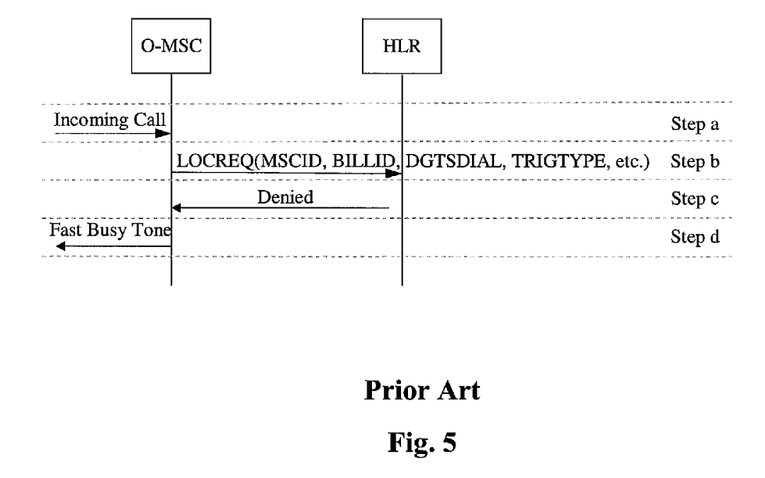
FIG. 5 is a conventional flow diagram that illustrates a call process for a call placed to a mobile station of a subscriber that subscribes to and has activated a do not disturb service.

FIG. 5 is a conventional flow diagram that illustrates a call process for a call placed to a mobile station of a subscriber that subscribes to and has activated the above-mentioned do not disturb service. The flow diagram illustrates the originating mobile switching center (O-MSC) and home location register (HLR) both of which are components of a mobile communication network (not shown) that supports the do not disturb feature. The subscriber's home HLR maintains the authorization status and activation status for the do not disturb service on a per-subscriber basis. When a call arrives at the called subscriber's home O-MSC (Step a), the O-MSC sends a query to the HLR for the subscriber's location (Step b). The query may be a location check request ("LOCREQ") that includes information used to identify the called subscriber, such as the MSCID (the ID of the O-MSC), BILLID (the billing ID for the call), DGTSDIAL (digits identifying the called party), and TRIGTYPE (indicates that the a mobile termination trigger was encountered). The HLR accesses the subscriber profile record associated with the called party/station and examines the subscriber's list of services, which may include the do not disturb feature. If the called subscriber subscribes to and has activated the do not disturb feature, in Step c, the HLR returns to the O-MSC a message indicating that the LOCREQ has been denied. In turn in Step d the O-MSC sends a fast busy tone to the calling party. The O-MSC has no function to determine the actual reason for the denial of the LOCREQ. As a result, the fast busy tone sent by the O-MSC is the same tone sent to all callers in response to a LOCREQ being denied. Although the messages and/or signal flow may vary somewhat, similar do not disturb services are provided by landline and/or voice over packet protocol type telephone networks.

The do not disturb feature provides several advantages. When activated, it is not necessary to complete a call to the subscriber, which conserves network resources. Also, the subscriber is not disturbed, i.e., the called station of the subscriber does not ring or otherwise notify the subscriber of an incoming call. The calling party will hear a fast busy tone, thus indicating that the subscriber has activated the do not disturb feature (this assumes that the calling party knows the meaning of a fast busy tone).

The do not disturb feature however has limited functionality. For example, the called party will have no knowledge of the status of the called party other than that the called party has activated the do not disturb feature. For example, if the subscriber is on an airplane, the do not disturb feature does not permit informing a calling party of that situation. In such case, the calling party may repeatedly attempt to contact the subscriber until the subscriber deactivates the do not disturb feature. This results in an inconvenience to both the caller and the subscriber, especially if the caller leaves multiple voicemails which requires the subscriber to listen to such voicemails. Additionally, the subscriber is not able to inform others of the reason for activating a do not disturb feature. For example, the subscriber is unable to inform callers that he or she will be unavailable for a specified period of time because of air travel. In many situations, this ability may be very important for the subscriber. Also, some callers may not know of the called subscriber's do not disturb service and misinterpret the fast busy tone as a network busy or service outage indication.

The need thus exists for an improved means to indicate to a caller that a subscriber is busy. A further need exists to extend the capability of the communication network to provide calling parties more detailed status information of the subscriber.

SUMMARY

The present disclosure fulfills the aforementioned needs, at least in part, by providing telephone call processing that establishes a path between the called switching center and a call feature server in response to receipt of the incoming call and transmits a predetermined message to the caller. The incoming call is disconnected without establishing a call leg to the called subscriber. As a result, the called subscriber is not disturbed by any notification of an incoming call because the incoming call is disconnected without extending a call leg to the subscriber. In addition, the called subscriber can personalize the predetermined message to be played to the caller The call interception feature allows a subscriber to send a predetermined message to any calling party that calls the subscriber or to a predetermined calling party or parties (i.e., not all calling parties). The subscriber may set the call interception feature to be active for some calling parties but not for others. The subscriber may set the call interception feature as active for a certain period of time during the day and as deactive at other times. The subscriber may also designate the time zone to which this applies. This will avoid any errors in adjusting for different time zones. Any combination of the aforementioned customizations may be implemented as well. As a result, the call interception feature is highly customizable.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The present teachings concern a call interception feature for calls made to mobile customers that subscribe to this feature. The call interception feature, when activated by a subscriber, plays a prerecorded message (audio and/or visual) to the caller and/or sends an SMS message to the calling party. In addition, with the call interception feature active, the subscriber is not disturbed because the wireless communication network (discussed below) does not establish a connection between the calling party and the subscriber.

The call interception feature is highly customizable and allows a subscriber to implement many customizations concerning how and to whom messages are sent. The call interception feature may be maintained by existing servers on a communication network or new servers specifically for the call interception feature.

The explanation that follows will begin with an explanation of an exemplary communication network and exemplary feature, such as a call ring tone feature, that may be implemented on that network. Following that explanation will be explanation of the call interception feature. The differences among the various foregoing features will highlight the usefulness and advantages of the call interception feature.

Figure 1:
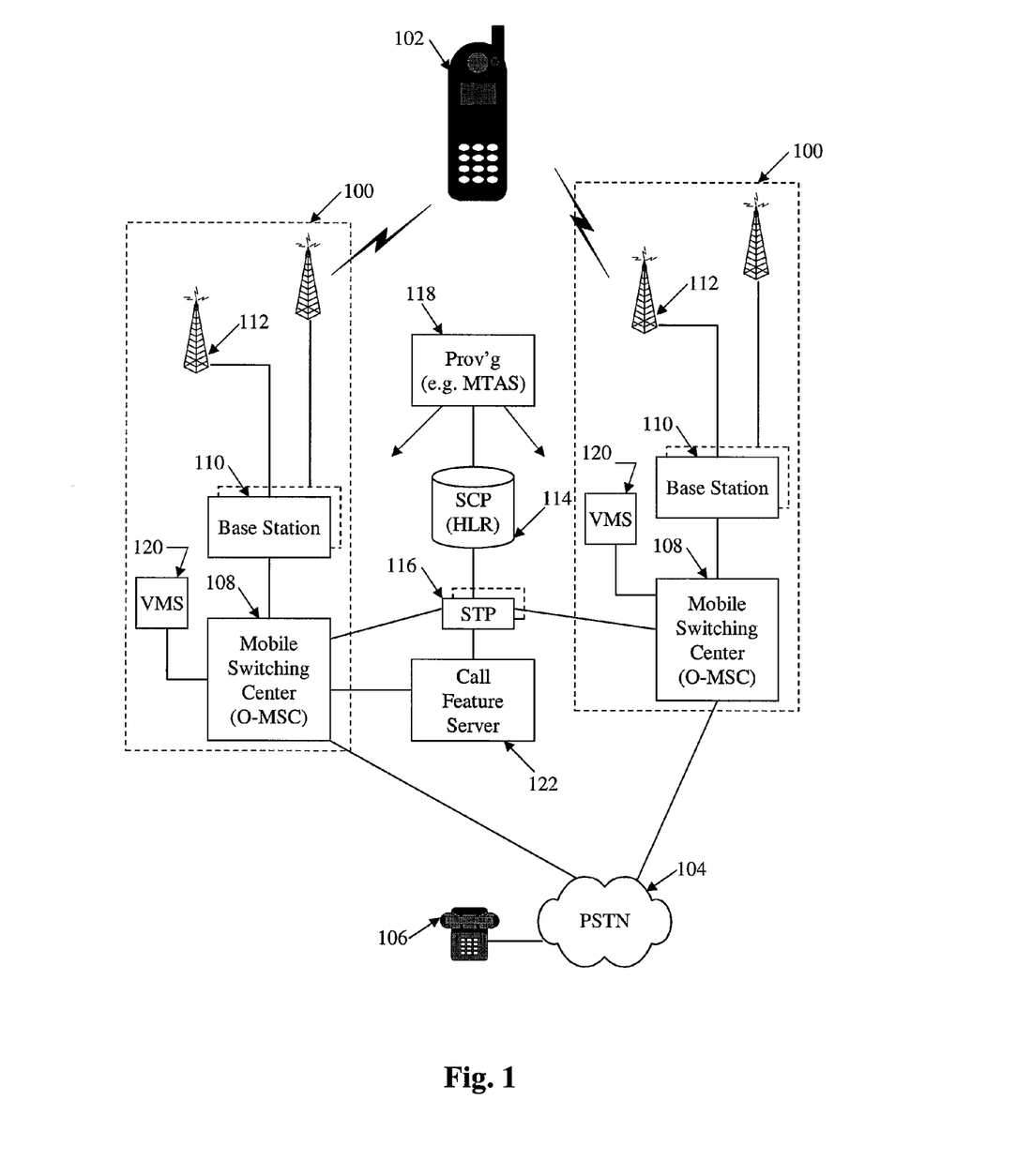
FIG. 1 depicts a wireless communication system for providing voice telephone communications.

FIG. 1 depicts a wireless communication system for providing voice telephone communications. Regional wireless communication networks 100 provide wireless telephone or personal communications service (PCS) type services to mobile stations depicted by way of example as a mobile station 102 in different service areas. Each network 100 enables users of the mobile stations 102 to initiate and receive telephone calls to each other, and to the respective other party's voicemail, as well as through the public switched telephone network (PSTN) 104 to telephone devices 106. These connections between mobile stations 102 or telephone devices 106 and such other devices or voicemail associated with those devices are known as "call legs." Wireless communication services may be provided in accordance with a digital protocol or an analog protocol or both. Each regional network 100 includes a mobile switching center (MSC) 108. Each MSC 108 connects through trunk circuits to a number of base stations 110, which are under the control of the respective MSC 108.

The base station 110, or base transceiver system (BTS), is the part of the wireless communication network 100 that sends and receives RF signals to/from the mobile stations 102 that the base station 110 currently serves. The base station 110 connects to and communicates through the antenna systems on a radio tower 112. The base station contains the transmitters and receivers at a site and is responsible for the control, monitoring, and supervision of calls made to and from each mobile station 102 within its serving area, over the wireless air link. The base station assigns and reassigns channels to the mobile stations 102 and monitors the signal levels to recommend hand-offs to other base stations (not shown).

Each network 100 typically includes a base station controller (BSC) functionality that controls the functions of a number of base stations 110 and helps to manage how calls made by each mobile station 102 are transferred (or "handed-off") from one serving base station to another. Each wireless network equipment vender implements this function differently. Some vendors have a physical entity, which they call a BSC, while other vendors include this functionality as part of their MSC. For convenience of illustration, it is assumed that the BSC functionality in the network 100 is incorporated into the MSC 108. Through the MSC 108 and the base stations 100, the network 100 provides voice-grade telephone services over the common air interface to and from the mobile stations 102. The network may include one or more additional elements (not separately shown), such as an inter-working function (IWF) or a Packet Data Serving Node (PDSN) to support data services over the logical communication channels of the wireless air interface, for example for communications via the Internet (not shown).

The network 100 typically utilizes a number of logical channels to provide signaling related to the network services, for example for paging called stations, registration, and the like. For example, the network 100 sends alert messages to the mobile station 102 over the paging channel, when there is an incoming call to the mobile station 102 or an incoming data message (e-mail or the like). The paging channel alert message contains address information specifically identifying the particular mobile station 102, and possibly information distinguishing the particular type of incoming call or message. In the uplink direction, the mobile station 102 registers with the network 100 serving the area in which the user is currently located. Once registered, the mobile station 102 periodically sends messages to the network 100 over the uplink access channel, to maintain its registered station.

The mobile station 102 includes a transceiver compatible with the particular type of wireless network. The mobile stations 102, the MSCs 108 and the base stations 110 implement one or more standard air-link interfaces. For example, the wireless telephone network may support dual-mode services. Although not shown separately, such a dual-mode network includes wireless telephone components that output analog telephone signals for transmission according to an analog wireless protocol (e.g., AMPS) as well as digital wireless system components that operate in accordance with a digital wireless protocol, for example the CDMA protocol IS-95. The base stations 110 may provide both types of services. Alternatively, the network 100 may comprise base stations 100 that send and receive voice and signaling traffic according to the prescribed analog protocol as well as digital base stations 110 that utilize the digital wireless protocol. Each dual-mode MSC 108 typically includes a switching subsystem for analog telephone services, a switching subsystem for digital telephone services, and a control subsystem. Other MSCs may implement only one type of service.

The digital wireless equipment may support any one of several common interface standards, including time division multiple access (TDMA), the Global System for Mobile communications (GSM) and code division multiple access (CDMA) standards. As will be familiar to those of ordinary skill, an air-link interface for each cellular service in a geographic area includes paging channels and/or signaling channels, as well as actual communications channels for voice and/or data services. The channels may be separate frequency channels, or the channels may be logically separated, for example based on time division or code division. The paging and signaling channels are used for preliminary coded communications between a cellular telephone and a cell site in setting up a telephone call or other session, after which a communication channel is assigned or set up for the telephone's use on that call.

The wireless communication network system includes a Home Location Register (HLR) that stores subscriber profiles for each of the wireless subscribers and their associated mobile station 102. The HLR may reside in the "home" MSC 108 or, as shown, in a centralized service control point (SCP) 114 (hereinafter HLR may be designated by 114). The SCP 114 communicates with the MSCs 108 via data links and one or more signaling transfer points (STPs) 116 of an out-of-band signaling system, typically, an SS7 network. As recognized in the art, the HLR 114 stores for each mobile subscriber the subscriber's mobile telephone number, the mobile identification number, information regarding the current location of the mobile station 102 and information specifying the wireless services subscribed to by the mobile subscriber, such as numeric paging or text-based paging, data communication services, do not disturb feature, multiple alerting, call interception (as discussed herein), etc.

The carrier also operates a number of different systems in one or more customer service centers. These include one or more billing systems, client account administration systems, network provisioning systems 118 such as the Mobile Telephone Administration system or "MTAS," and the like. The billing system (not shown), for example, receives usage and operations data from the MSCs 108 and processes that data to generate bills for individual customers and to forward data regarding users roaming through the carrier's service area through a clearinghouse (not shown) for reconciliation. The MTAS provides data to the HLR 114 in the SCP 114 and/or to the MSCs 108 to provision services for new mobile stations 102 and modifies provisioning data as customers change their subscriptions to obtain different sets of services from the carrier. Voice mail service (VMS) platform 120 may be provided directly linked to each MSC 108, as shown, or located at a central network site.

In the example, the system also includes at least one call feature server 122. Call feature server 122 is capable of storing a plurality of various prerecorded audio or video presentations and pre-selected ring tones for transmission over the wireless network 100 and PSTN network 102. While illustrated as being coupled to an MSC 108 and STP 116, the call feature server 122 may be located anywhere that trunk and signaling system links are available.

As a customer using a mobile station 102 roams into the service area of another network 100, the station 102 registers with that system. Service information is transferred from the HLR in the SCP 114 to a Visitor Location Register (VLR) in the visited access network during the successful registration process. Specifically, a visited wireless communication network assigns a register, as a VLR, to a mobile station 102 during a period when the station roams into the wireless serving area of the visited provider's network and remains registered on that visited system. The VLR communicates with the HLR in the SCP 114 to authenticate the mobile station 102 and obtain a copy of subscriber subscription service information, from the HLR during the registration process, typically via packet messages exchanged via the SS7 interoffice signaling network.

In a call placed to a telephone number of a mobile station 102 from a telephone device 106 of PSTN network 104, the serving end office in the PSTN 104 recognizes the NPA-NXX digits in the dialed number as those of a carrier served through the tandem (not shown) that couples the PSTN to the called party's home MSC 108. The PSTN end office responds by routing the call to the tandem, and the tandem routes the call to the home MSC 108 for completion to the destination station 102. If the station 102 is registered with the particular network (i.e., within the home region), the home MSC 108 completes the call through the appropriate base station 110 and transmitter tower 112. If the station 102 is not registered with the home network 100 (i.e., not within the home region), the originating MSC 108 in that region routes the call to the MSC (serving system) in the region where the called station is currently registered as a visiting or roaming customer. To determine the appropriate terminating MSC in the visited region, the home or originating MSC queries the HLR (or the SCP) 114 regarding the current location of the called mobile station 102. The serving system may be a system of the same provider or a system operated by another provider. In the event that the called mobile station 102 does not answer, the MSC 108 designated as the home MSC may roll the call over to a voice mail system 120.

Some services utilize 'intelligent' call processing to provide advanced features, such as multiple alerting. For those kinds of services, the MSC 108 processing a call to or from a mobile station 102 will detect an event in call processing commonly referred to as a "trigger." Upon hitting a trigger, the MSC 108 will communicate through the links and STP(s) 116 of the SS7 signaling network with a database in an SCP 114 to obtain instructions regarding further processing of the call. The SCP 114 typically is the one that provides the HLR, although some features could utilize one or more additional SCPs. When the MSC 108 that detected the trigger event has obtained sufficient information, it will continue processing of the call. Implementations of such Advanced Intelligent Network (AIN) processing may involve multiple triggers and associated exchanges between the MSC and one or more SCPs to determine how to complete each individual call in accordance with one or more AIN features provided to the user of the mobile station 102.

It is useful to understand the versatility of the system illustrated by FIG. 1 to support implementation of multiple types of features, which includes call ring tone features and call interception features. The following explains the capability of the network for supporting a call ring tone feature followed by an explanation the capability of the system to support a call interception feature. The following is useful for understanding different functional aspects of each feature and how they are implemented on the system of FIG. 1.

The system illustrated in FIG. 1 provides a call ring tone service for calls to mobile customers that subscribe to this feature. The subscriber's home HLR 114 maintains the authorization status and activation status for this service on a per-subscriber basis. When a call arrives at the called subscriber's home MSC 108, illustrated as being within the network 100 at the left side of the drawing, the MSC 108 sends an initial query to the HLR 114 for the subscriber's location. The HLR 114 determines whether this feature is active for the subscriber. If it is, the HLR 114 responds with a message containing an indication that the incoming call should be connected to the call feature server 122. Instead of playing the standard ring tone or busy tone to the caller, the call feature server 122 plays a message pre-selected by the called subscriber that is stored on the server 122 in lieu of the standard ring.

During this time a connection is made to the called subscriber. While this connection is made, the HLR database will locate the subscriber station 102, in response to a second request from the subscriber's home MSC. If the called subscriber is at a roaming location, the HLR 114, which maintains a pointer to the subscriber as the subscriber roams, obtains a temporary routing number from the MSC 108 serving the location of the subscriber station, exemplified as that at the right side of the drawing. The temporary routing number is passed to the home MSC to extend a call leg to the MSC 108 of the network 100 at the subscriber's location. When the subscriber answers the incoming call leg, the home MSC disconnects the call feature server 122 from the caller and connects the caller to the call leg to the subscriber to complete the call so that calling and called parties can converse.

Different signaling protocols and protocol elements can be used in providing this service. For example, in a wireless network that uses the TIA/EIA-41 protocol, the HLR could use a protocol extension field within the OneTimeFeatureIndicator parameter (OTFI) to inform the home MSC that the incoming call should be connected to the call feature server 122, and the HLR could use the RoutingDigits parameter to pass HLR stored routing information back to the HLR. In such a network, the home MSC and HLR could use Wireless Intelligent Network triggers and protocol standardized by the IS-771 extensions to TIA/EIA-41 to distinguish between the initial request for the subscriber's location and the second request for that location. The connection of the incoming call to the call feature server 122 could be controlled using the ISUP protocol as standardized for use in North American networks by T1.113. In this case, the identity of the caller and of the called subscriber might be carried by the Calling Party Number parameter and the Redirecting Number parameter, respectively, although there are other parameters that could also be used. The routing information could be carried in the Called Party Number parameter.

In addition to the call ring tone service described above, the wireless communication network 100 also supports a call interception feature for calls made to mobile customers that subscribe to this feature. The call interception feature, when activated by a subscriber, plays a prerecorded message (audio and/or visual) to the caller and/or sends an SMS message to the calling party. A "predetermined message" as used herein refers to a prerecorded message (audio and/or visual), text message, SMS message, or any combination of the foregoing that are pre-selected or pre-recorded by the subscriber. In addition, with the call interception feature active, the subscriber is not disturbed because the wireless communication network 100 does not establish a connection between the calling party and the subscriber.

The call interception feature is highly customizable. The feature allows a subscriber to send a predetermined message to any calling party that calls the subscriber or to a predetermined calling party or parties (i.e., not all calling parties). For example, the subscriber may designate a first predetermined message to be sent to his or her boss and a second predetermined message to be sent to his or her friends. The subscriber may set the call interception feature to be active for some calling parties but not for others. For example, the subscriber may set the call interception feature as active for when his or her boss is the calling party and deactivate the feature for all other parties. The subscriber may set the call interception feature as active for a certain period of time during the day and as inactive at other times. The subscriber may also designate the time zone or interval to which this applies. For example, if the subscriber knows that he or she will be unavailable from 2 pm to 4 pm in the afternoon, the subscriber may activate the call interception feature during this time. The subscriber may also designate the time zone for the his or her current location, a default time zone, or the time zone for a particular calling party. This will avoid any errors in adjusting the call interception feature active interval for different time zones as the subscriber roams. Any combination of the aforementioned customizations may be implemented as well. For example, the subscriber may set the call interception feature as active from 2 pm to 4 pm Eastern Standard Time for calling parties originating from the mobile customer's place of work only and deactivate the feature for all other calling parties. The call interception feature and associated messages may be maintained by a server that maintains multiple service features, such as the call feature server 122, or a different server (an independent server or server associated with other functional aspects of the mobile communication network 100). For ease of illustration and explanation, the call feature server 122 of the mobile communication network 100 of FIG. 1 maintains the call interception feature and call back ring tone feature.

Among many reasons, the call interception feature differs from the call ring tone service and do not disturb feature described herein. Unlike the existing do not disturb feature, a subscriber can send a predetermined message to a calling party when the call interception feature is active. Also, for the do not disturb feature, the MSC sends the same fast busy ring tone to all calling parties when subscribers activate the feature because the MSC is incapable of maintaining information on a per-subscriber basis, unlike the HLR. By contrast, the communication network 100 maintains the call interception feature differently than the do not disturb feature as described herein thus making possible highly customizable configurations for the call interception feature. Unlike the call ring tone feature, a subscriber is not disturbed by any notification of an incoming call because the incoming call is disconnected without extending a call leg to the subscriber; the subscriber can personalize a predetermined message to be played in lieu of a standard ring; and the call interception feature is highly customizable as described above.

Figure 2:
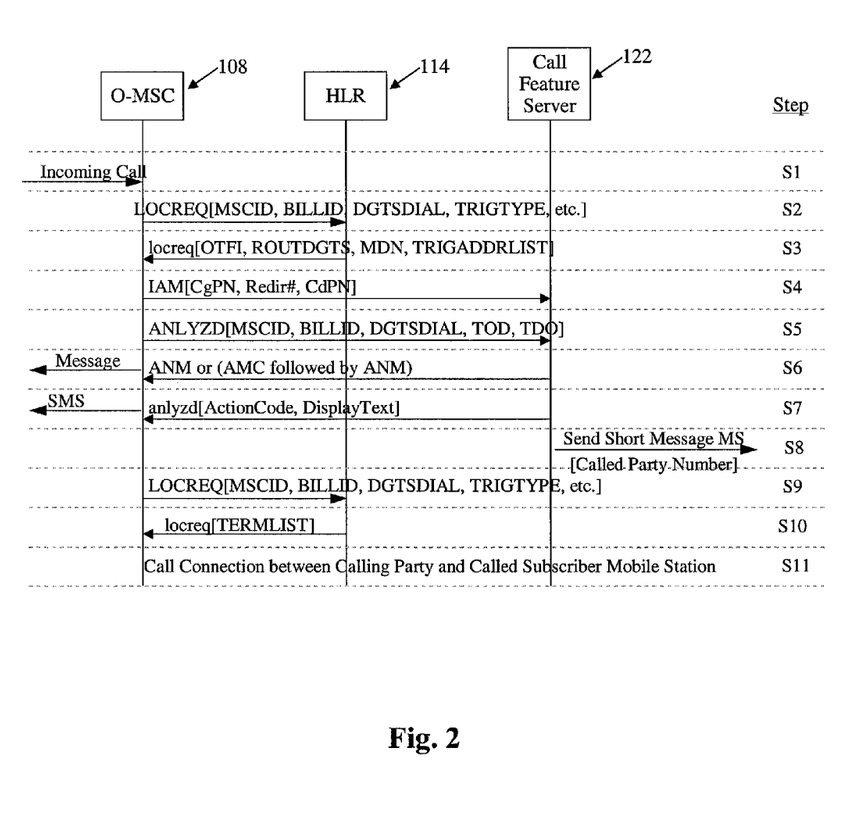
FIG. 2 is a flow diagram that illustrates a call process for a call placed to a mobile station that subscribes to a call interception feature.

FIG. 2 is a flow diagram that illustrates a call process for a call placed to a mobile station that subscribes to the call interception feature, for example, as might be implemented in a system such as that shown in FIG. 1. At the top of the diagram are blocks, horizontally spaced, which represent the home originating mobile switching center (O-MSC) 108, HLR 114, and a call feature server 122. The steps of the flow diagram are shown successively in the downward direction, interaction between participating blocks indicated by horizontal arrows with associated call processing parameters. Each step is denoted by the numbers (S1, S2, etc.) in the right most portion of the figure, and a dotted line separates each step from the preceding or succeeding step.

At step S1, an incoming call is received at the O-MSC. The call may originate from a mobile station or a landline station, as generally described above for the wireless communication network 100. At step S2, the O-MSC detects a mobile termination trigger and sends a location request invoke (LOCREQ) message to the HLR associated with the mobile subscriber, seeking instructions on how to process the call. The relevant parameters included in a location request are well known and summarized with their usage in the illustrated call process in the following table.

| Parameters | Usage |
| --- | --- |
| MSCID | The ID of the MSC. |
| BILLID | The Billing ID for the call. |
| DGTSDIAL | Digits identifying the called party. |
| TRANSCAP | Set to indicate the O-MSC's Transaction Capabilities, including support for the TriggerAddressList parameter. |
| TRIGTYPE | Indicates that the Mobile Termination trigger was encountered. |
| WINCAP | Set to indicate the O-MSC's WIN Capabilities. |

At step S2, if the called subscriber's HLR is the same as the HLR receiving the LOCREQ, that HLR may service the LOCREQ. Although the following is not shown in FIG. 2, the following is well known to those of ordinary skill in the art. If the called subscriber is at a roaming location, the HLR, which maintains a pointer to the subscriber as the subscriber roams, obtains a temporary routing number from the MSC serving the location of the subscriber station (exemplified as that at the right side of the drawing of FIG. 1). The temporary routing number is passed to the home MSC (exemplified as that at the left side of the drawing of FIG. 1) to extend a call leg to the MSC of the network at the subscriber's location. Such operation for locating a subscriber's home location and extending a call leg to the MSC is well known to those of ordinary skill in the art.

At step S3, the HLR examines the subscriber's list of services, which includes the call interception feature, and determines if the call interception feature is authorized and active. If it is, the HLR returns an answer message (locreq) to the O-MSC. The relevant parameters of this message and usage are summarized in the following table.

| Parameters | Usage |
| --- | --- |
| OTFI (One Time Feature Indicator) | The RPE1 field in octet 3 of the OTFI is set to indicate that the call interception feature is authorized and active. |
| ROUTDGTS (Routing Digits) | Set to the number to be used to route to the call feature server. |
| MDN (Mobile Directory Number) | Set to the called subscriber's mobile directory number. |
| TRIGADDRLIST (Trigger Address List) | Set to arm the Initial Termination and Location triggers (for setting termination point for subsequent communication by the O-MSC and locating the mobile station). |

At step S4, the O-MSC sends an ISUP IAM message to the call feature server so as to establish a trunk path between the O-MSC and the call feature server. In the exemplary implementation, unlike the do not disturb feature, a trunk is established in order to transmit the predetermined message from the call feature server to the O-MSC in order for the predetermined message to be played to the calling party. By contrast for the do not disturb feature, there is no need for a trunk because the O-MSC plays the standard fast busy ring tone. The parameters of the IAM message and usage are summarized in the following table.

| Parameter | Usage |
| --- | --- |
| CgPN (Calling Party's Number) | The phone number of the caller. |
| Redir# (Redirection Number) | Set to the called subscriber's MDN. |
| CdPN (Called Party Number) | Set to the number to be used to route to the audio content server as received in ROUTDGTS. |

While FIG. 2 illustrates step S5 following step S4 in succession, it should be understood that Step S5 may occur at the same time as, during, or after step S4. At step S5, an Initial Termination trigger causes the O-MSC to extends the call leg to the Call Feature Server according to the ROUTDGTS from step S3. Therefore, information sent by the O-MSC will terminate at the call feature server. The O-MSC sends an analyze information request ANLYZD that includes parameters summarized below.

| Parameter | Usage |
| --- | --- |
| MSCID (Mobile Switching Center ID) | The ID of the MSC. |
| BILLID (Billing ID) | The Billing ID for the call. |
| DGTSDIAL (Digits Dialed) | Digits identifying the called party. |
| TOD (Time of Day) | Indicates the time of day in which the calling party made the call. |
| TDO (Day of the Week) | Indicates the day of week in which the calling party made the call. |

At least the MSCID, BILLID and DGTSDIAL parameters are the same parameters sent to the HLR accompanying the LOCREQ. At step S5 however, the O-MSC sends these parameters and other parameters such as TOD and TDO for use by the call feature server to determine any pre-provisioned arrangement settings for the calling party. Such settings were generally described above and are described in more detail below for each setting at steps S6 and S7.

At step S6, in response to step S4 the call feature server either returns an ISUP answer message (ANM) or it returns an ISUP address complete message (ACM) not containing the cause parameter followed by an ISUP ANM toward the O-MSC. In the illustrated example, the server determines that it has the resources to accept the incoming call leg and the foregoing messages are used to establish a call from the O-MSC 108 and the call feature server 122.

In addition, at step S6, the call feature server determines any pre-provisioned arrangement settings for the calling party. The service may offer the subscriber a variety of customizations options.

First, the call interception feature allows a subscriber to send a predetermined message to all calling parties or to a predetermined calling party or parties (i.e., not all calling parties). If the subscriber set the call interception feature for all calling parties, the call feature server determines the predetermined message for all calling parties and transmits information containing such message to the O-MSC. If the subscriber set the call interception feature to send a first predetermined message to a first calling party and a second predetermined message to a second calling party, the call feature server determines which message is to be played. The call feature server compares the CgPN parameter sent at step S5 with the telephone number associated with the first and second predetermined messages. If the CgPN parameter matches the calling party telephone number associated with the first predetermined message, the call feature server transmits information containing the first predetermined message to the O-MSC. Likewise, if the CgPN parameter matches the telephone number associated with the second predetermined message, the call feature server transmits information containing such second predetermined message to the O-MSC.

Second, the call interception feature allows the subscriber to set the call interception feature to be active for some calling parties but not for others. The call server feature determines this setting based on the CgPN parameter sent at step S5. As before, if the CgPN parameter matches a telephone number for which the call interception feature is active, the call feature server transmits information containing a predetermined message to the O-MSC. If the call feature server transmits an SMS message, the message will be routed through the SMSC server (not shown), as is well known to those of ordinary skill in the art. The call feature server may check for additional settings, such as whether the calling party is to receive a first or second predetermined message as described above. If the CgPN parameter matches the telephone number for which the call interception feature is inactive, the call feature server may not transmit information containing a predetermined message to the O-MSC. Instead, the communication network connects the caller with the subscriber as explained with reference to Steps S9 through S10 below.

Third, the subscriber may set the call interception feature as active for a certain period of time during the day and as deactive at other times. The call feature server determines this setting based on the TOD parameter sent at step S5. If call feature server determines that the calling party made the call at a time of day (as indicated by the TOD parameter) during the time in which the call interception feature is to be active, the call feature server transmits to the O-MSC information containing a predetermined message. Alternatively, the call feature server may activate the call interception feature for the time period specified by the subscriber. In such case, the call feature server does not need to check the TOD parameter but rather checks the CgPN parameter in order to determine if the calling party's call is to be intercepted as described above.

Fourth, the subscriber may also designate the time zone to which activation and deactivation applies. This is especially useful if the subscriber plans to travel to a different time zone and desires to set the call interception feature based on that time zone so as to avoid calculating any time difference. If the subscriber selects a time zone that is different from the subscriber's current time zone, the call feature server may automatically calculate the time period (in any time zone) for which the call interception feature is to be active. In this manner, the call feature server may check additional settings as described above.

While any combination of the aforementioned customizations of the call interception feature may be implemented as well, the call feature server may set a priority in which to check the various settings. For example, the call feature server may first check to determine whether or not the call feature is active. If so, the call feature server may check the CgPN parameter to determine whether or not a predetermined message is to be played to the calling party or whether or not the call interception feature has been deactivated for such calling party. Alternatively, the call feature server may first check CgPN parameter to determine whether or not a predetermined message is to be played to the calling party or whether or not the call interception feature has been deactivated for such calling party. If the former is true, the call feature server may determine whether or not the call feature is active. If the latter is true, the call feature server need not determine whether or not the call feature is active. Other orders of priority are possible and one of ordinary skill may choose to implement a priority different than that described above.

As a result of the analysis performed by the call feature server in step S6, at step S7 the call feature server transmits to the O-MSC an "anlyzd" message which includes at least an "ActionCode" parameter. The ActionCode parameter indicates whether to complete the call or disconnect the call between the calling party and the called subscriber. If the call feature server transmits a predetermined message to the O-MSC server to be played to the calling party, the ActionCode parameter will instruct the O-MSC server to disconnect the call after the predetermined message has been played. For example, the calling party will receive a predetermined message, e.g., "The party that you have attempted to reach is unavailable," from the call feature server according to the logic in FIG. 2. The call flow may terminate at this point without establishing a call leg between the calling party and the called subscriber. On the other hand, if the call feature server determines that the calling party is to be connected to the called subscriber, the ActionCode parameter will instruct the O-MSC server to complete the call. The call flow would continue from this point.

Additionally, at step S7, the call feature server may send the "anlyzd" message to the O-MSC server with other parameters such as "DisplayText," which provides the text to be sent as an SMS message to the calling party. This of course assumes that the calling party's handset is capable of receiving such messages. As mentioned above, the predetermined message may include SMS messages. The SMS message may be sent to the calling party if the call is to be disconnected. For example, the SMS may textually inform the calling party that the called subscriber is in a meeting. Also, the SMS message may be sent to the calling party even if the call is to be connected. For example, the SMS may textually inform the calling party that the called subscriber is busy so that the when a connection is made, the calling party is not surprised if the subscriber called does not answer or is short with the calling party. The SMS settings are set by the subscriber and the call feature server maintains the information concerning the distribution of the SMS.

At step S8, the call interception feature may send an SMS message to the called subscriber so as to inform that subscriber that a call has been intercepted. The SMS may display the calling party's number or any other message programmed by the called subscriber. At step S8, the call feature server sends the SMS message through a message server (MS) through an SMSC (not shown), as is well known to those of ordinary skill in the art.

At step S9, if the call is to be connected (indicated by the ActionCode in step S7) the O-MSC sends another LOCREQ message to the HLR. The parameters differ from those of first LOCREQ of step S2 in that the TRIGTYPE indicates that a Location trigger was encountered. Other parameters are the same however.

At step S10, if the HLR determines that the incoming call originated from a mobile station in its home region, the HLR returns a locreq message to the O-MSC directing the O-MSC to deliver the call locally. The TERMLIST parameter contains a local termination.

At step S11, a call connection between the calling party and the called subscriber is established. In this step, the O-MSC pages the mobile station of the calling party. The mobile station of the calling party responds to the page, the mobile station is brought up on a traffic channel, and the called subscriber is alerted. If the called subscriber is not busy, the called subscriber may answer the call. Once the called subscriber answers the call, the O-MSC disconnects the incoming call from the call leg to the call feature server, connects the incoming call to the mobile station of the called subscriber, and sends an ISUP release (REL) message towards the call feature server. Subsequently, the call feature server releases the call leg from the O-MSC and returns an ISUP RLC message towards the O-MSC. The O-MSC releases the trunk towards the call feature.

While the above description pertains to implementation of the call interception feature on a mobile communications network, the concepts disclosed herein are not limited to such network 100. A non-mobile network may implement the call interception feature. An example of a non-mobile network is a landline network.

Figure 3:
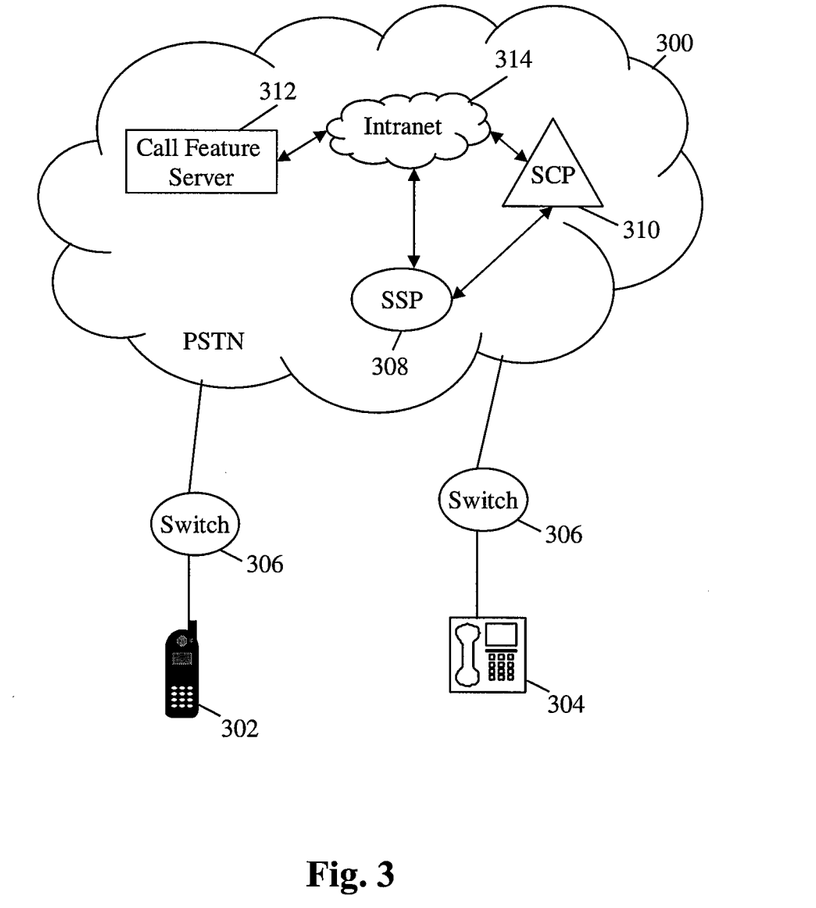
FIG. 3 depicts a communication system for providing voice telephone communications over a non-mobile network such as a Public Switched Telephone Network.

FIG. 3 depicts a communication system for providing voice telephone communications over a non-mobile network such as Public Switched Telephone Network (PSTN) 300. The PSTN 300 may be connected to a wireless telecommunication network 100 as illustrated in FIG. 1. Exemplary communication devices which may connect to the PSTN 300 include mobile station 302 and terrestrial landline telephone 304. Other exemplary communication devices (not shown) include a Personal Digital Assistant (PDA), an IP phone, a modem, an interactive page, an Global Positioning System (GPS), an MP3 player, a digital signal processor, an interactive television, a digital video recorder, a satellite phone, or any other device that includes telephonic capabilities. The mobile station 302 may connect to communication devices on the PSTN 300 through a switch 306 via the exemplary wireless commutation network 100 illustrated by FIG. 1. The terrestrial telephone 304 likewise connects to communication devices on the PSTN 300 via a switch 306.

The PSTN 300 may include wired, optical, and/or wireless elements and may further include private network elements, such as private branch exchanges (PBXs), and/or other elements (not shown). The PSTN 300 includes Advanced Intelligent Network (AIN) componentry controlling many features of the network. The PSTN 300 and/or each of the switches 306 could also include a packet-based "soft switch" that uses software control to provide voice, video, and/or data services by dynamically changing its connections data rates and protocols types. The means of communicating between the components of the PSTN 300 discussed below include a variety of means, including optical transmission of data (e.g., any medium capable of optically transmitting the data), wireless transmission of data (e.g., wireless communications of the data using any portion of the electromagnetic spectrum), and/or fixed-wire transmission of data (e.g., any medium capable of transmitting electrons along a conductor). Fiber optic technologies, spectrum multiplexing (such as Dense Wave Division Multiplexing), Ethernet and Gigabit Ethernet services, Infrared, the family of IEEE 802 standards, and Digital Subscriber Lines (DSL) are just some examples of the transmission means. The signaling between the components are well understood in by those of ordinary skill the art and will not be further described.

In simplified form for describing the novel concepts herein the PSTN 300 includes a service switching point (SSP) 308, a service control point (SCP) 310, an Intranet 314 (for the telecommunications provider to administer and program the telecommunications network components or for the customer to access and program call feature services), and a call feature server 312. Other components of the PSTN 300 are well understood in by those of ordinary skill the art and will not be further described.

The PSTN 300 many contain many SSPs 308 each of which serve as the local exchanges in the PSTN 300. SSPs 308 may have additional capabilities such as providing an Integrated Services Digital Network (ISDN) interface for the Signaling Transfer Points (not shown). However, such features are well understood in the art and are not repeated herein.

The Service Control Point (SCP) 310 of the PSTN 300 acts as an interface to various components in the PSTN. For example, database access is provided through the SCP 310 to access requested information from a SSP, for example. The functions of the SCP 310 are well understood in the art and are not repeated herein.

The PSTN 300 also includes a call feature server 312 that is capable of storing a plurality of various prerecorded audio or video presentations and pre-selected ring tones for transmission over the PSTN network 100. While illustrated as being coupled to the SCP 310 via an intranet 314, the call feature server 312 be connected directly to an SSP 308 via intranet 314 once a connection has been established. Also, the call feature server 312 may be located anywhere that trunk and signaling system links are available. The call feature server 312, like the call feature server 122 in the wireless communication network 100 of FIG. 1, supports a call interception feature for telephone customers on a PSTN network 100. As discussed above, the call interception feature, when activated by a telephone customer, plays prerecorded messages (audio and/or visual). A "predetermined message" as used herein in the context of a PSTN 300 refers to a prerecorded message (audio or visual) or a combination to both that are pre-selected or pre-recorded by the telephone customer. In addition, with the call interception feature active, the telephone customer is not disturbed because the PSTN 100 does not establish a connection between the calling party and the telephone customer 300. The call interception feature on the PSTN 100 is highly customizable as described above in the context of the wireless communication network 100. However, such description is not repeated herein.

Figure 4:
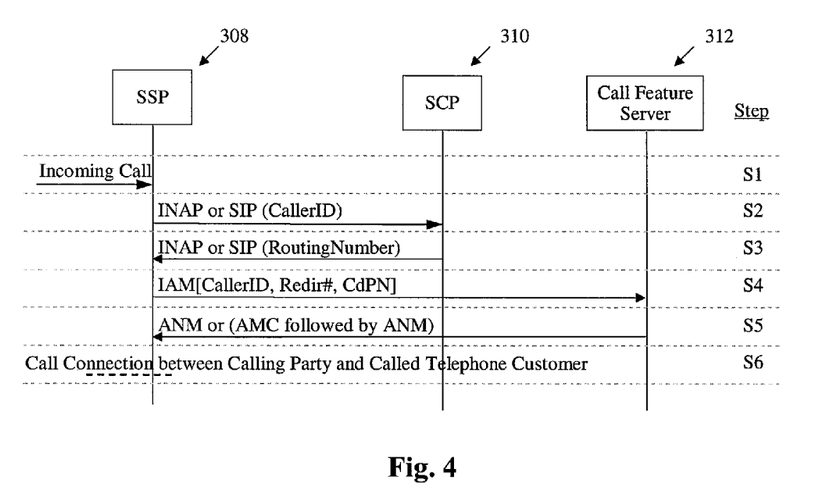
FIG. 4 is a flow diagram that illustrates a call process for a call placed to a landline telephone device that subscribes to a call interception feature.

FIG. 4 is a flow diagram that illustrates a call process for a call placed to a landline telephone device 304 that subscribes to the call interception feature. At the top of the diagram are blocks, horizontally spaced, which represent the SSP 308, SCP 310, and call feature server 312. The steps of the flow diagram are shown successively in the downward direction, interaction between participating blocks indicated by horizontal arrows with associated call processing parameters. Each step is denoted by the numbers (S1, S2, etc.) in the right most portion of the figure, and a dotted line separates each step from the preceding or succeeding step.

At step S1, an incoming call is received at the SSP. The call may originate from a mobile station or a landline station, as generally described above for the landline communication network 300.

At step S2, the SSP detects that the called party has a call interception feature and the SSP component sends a request to the call feature server via SCP server and intranet (not shown). In the illustrated example, the request is INAP (Intelligent Network Application Protocol) or SIP (Session Initiated Protocol) compliant. Typically legacy landline networks utilize INAP. VoIP networks utilize SIP which includes caller ID information.

At step S3, the SCP server examines the message and sends an INAP or SIP return message to the SSP. The message includes the Routing Number ("RoutingNumber") to the call feature server that maintains the call interception settings for the called party.

At step S4, the SSP server sends an IAM message to the call feature server so as to establish a trunk path between the SSP server and the call feature server. In the exemplary implementation, a trunk is established in order to transmit the predetermined message from the call feature server to the SSP server in order for the predetermined message to be played to the calling party. The parameters of this message and usage are summarized in the following table.

| Parameter | Usage |
| --- | --- |
| CallerID (Calling Party's Number) | The phone number of the caller. |
| Redir# (Redirection Number) | Set to the called party's number. |
| CdPN (Called Party Number) | The phone number of the called party. |

At step S5, the call feature server either returns an ISUP answer message (ANM) or it returns an ISUP address complete message (ACM) not containing the cause parameter followed by an ISUP ANM toward the SSP. In the illustrated example, the server determines that it has the resources to accept the incoming call leg. The function of the call feature server are the same as those described above at step S6 for FIG. 2. These features are not repeated herein.

At step S6, if the called party deactivated the call interception feature entirely or for the calling, a call connection is established between the calling party and the called party. Steps for establishing a connection between such parties on a landline communication network are well known to those of ordinary skill in the telecommunications field.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for processing an incoming call from a caller for a called mobile station subscriber, the method comprising the steps of:
   (a) receiving the incoming call from the caller for the called mobile station in a mobile telephone communication network having a plurality of base stations interfaced for wireless communications with a plurality of mobile stations, a voicemail system for providing voicemail service for users of the mobile stations and a call feature server, separate from the voicemail system, wherein the call feature server: maintains settings of a do-not-disturb call interception feature that are preset by the called mobile station subscriber, and stores first and second redetermined messages that are re-selected or pre-recorded by the called mobile station subscriber;
   (b) in response to the incoming call, determining whether the do-not-disturb call interception feature is active with respect to the called mobile station by query to a home location register coupled to the mobile telephone communication network and having stored therein identification of mobile stations subscribed to the do-not-disturb call interception feature;
   (c) responsive to the do-not-disturb call interception feature being active with respect to the called mobile station, establishing a call path through the network to the call feature server;
   (d) determining which of the first and second predetermined messages to send to the caller in accordance with the settings preset by the called mobile station subscriber in the call feature server;
   (e) responsive to the determining step (d), transmitting the first predetermined message or the second predetermined message from the call feature server through the network to the caller; and
   (f) disconnecting the incoming call from the caller without establishing a call leg through the network to the called mobile station, so that the mobile station of the subscriber will not ring or otherwise receive any normal notice at the time of the incoming call, and without establishing a call leg for the incoming call through the network to between the caller and the voicemail system which serves the called mobile station subscriber.

2. The method as recited in claim 1, wherein the determining of whether the do-not-disturb call interception feature is active is based on the settings preset by the called mobile station subscriber.

3. The method as recited in claim 1, wherein step (d) comprises:
   (i) determining an identity of the caller; and
   (ii) determining whether the do-not-disturb call interception feature is active for the identified caller based on the settings preset by the called mobile station subscriber.

4. The method as recited in claim 3, wherein step (ii) comprises determining whether a phone number of the caller corresponds to a phone number for which the do-not-disturb call interception feature is active based on the settings preset by the called mobile station subscriber.

5. The method as recited in claim 1, wherein step (d) further comprises determining whether a phone number of the caller corresponds to a phone number which is associated with the first predetermined message or the second predetermined message based on the settings preset by the called mobile station subscriber.

6. The method as recited in claim 1, wherein step (b) comprises:
   determining whether the do-not-disturb call interception feature is active for a preset period of time based on the settings preset by the called mobile station subscriber; and
   determining whether the incoming call is made during the period of time for which the do-not-disturb call interception feature is active.

7. The method as recited in claim 5, further comprising:
   adjusting a time at which the incoming call is made or the period of time for which the do-not-disturb call interception feature is active for any difference between a first time zone from which the incoming call originated and a second time zone corresponding to the period of time.

8. The method as recited in claim 1, further comprising:
   activating or deactivating the do-not-disturb call interception feature for a period of time based on the settings preset by the called mobile station subscriber.

9. The method as recited in claim 1, wherein each of the first predetermined message and the second predetermined message corresponds to a pre-recorded or pre-selected audio message or visual message, a predetermined textual message, or an SMS message.

10. The method as recited in claim 1, wherein each of the first predetermined message and the second predetermined message corresponds to a combination of at least two messages selected from the group consisting of a pre-recorded or pre-selected audio message, a pre-recorded or pre-selected visual message, a predetermined textual message, and an SMS message.

11. The method as recited in claim 1, wherein the incoming call from the caller for the called mobile station subscriber corresponds to a first incoming call from a first caller for the called mobile station, further comprising a method for processing a second incoming call from a second caller for the called mobile station subscriber, the method comprising the steps of:
  (i) establishing a call path to the second caller if the called mobile station subscriber subscribes to the do-not-disturb call interception feature;
  (ii) determining whether to send a predetermined message to the second caller or establish a connection between the second caller and the called mobile station subscriber based on the settings preset by the called mobile station subscriber when the do-not-disturb call interception feature is active; and
  (iii) transmitting the predetermined message from the call feature server to the caller or establishing a call connection between the second caller and the called mobile station subscriber in response to step (ii).

12. A mobile telephone communications system comprising:
  a mobile telephone network having a plurality of base stations interfaced for wireless communications with a plurality of mobile stations and a voicemail system for providing voice mail service for users of the mobile stations;
  a home location register coupled to the mobile telephone network and having stored therein identification of mobile stations subscribed to a do-not-disturb call interception feature; and
  a call feature server coupled to the mobile telephone network and separate from the voicemail system, wherein the call feature server: maintains settings of the do-not-disturb call interception feature that are preset by a called mobile station subscriber, and stores first and second predetermined messages that are pre-selected or pre-recorded by the called mobile station subscriber; wherein:
  in response to receipt of an incoming call in the network, for wireless delivery to a called mobile station, determination is made whether the called mobile station subscriber subscribes to the do-not-disturb call interception feature and the do-not-disturb call interception feature is active for the called mobile station, by a query to the home location register,
  a call path is established through the network to the call feature server when the called mobile station subscriber subscribes to the do-not-disturb call interception feature and the do-not-disturb call interception feature is active for the called mobile station;
  determination is made as to which of the first predetermined and second predetermined messages to send to the caller in accordance with the settings preset in the call feature server by the called mobile station subscriber when the do-not-disturb call interception feature is active;
  based on the message determination, the first predetermined message or the second predetermined message is transmitted from the call feature server through the network to the caller when the do-not-disturb call interception feature is active; and
  the incoming call from the caller is disconnected without establishing a call leg through the network to the called mobile station, so that the mobile station of the subscriber will not ring or otherwise receive any normal notice at the time of the incoming call, and without establishing a call leg for the incoming call through the network to between the caller and the voicemail system which serves the called mobile station subscriber.

13. The mobile telephone communications system as recited in claim 12, wherein each of the plurality of predetermined messages is associated with an identity of at least one possible caller that is maintained by the call feature server.

14. The mobile telephone communications system as recited in claim 12, wherein each of the first predetermined message and the second predetermined message corresponds to a pre-recorded or pre-selected visual message or predetermined textual message or SMS message.

15. The mobile telephone communications system as recited in claim 12, wherein each of the first predetermined message and second predetermined message corresponds to a combination of at least two messages selected from the group consisting of a pre-recorded or pre-selected audio message, a pre-recorded or pre-selected visual message, a predetermined textual message, and an SMS message.

16. The mobile telephone communications system as recited in claim 12, wherein the call feature server is configured to send a predetermined message to all calling parties or to a predetermined calling party for the called mobile station subscriber based on the settings preset in the call feature server by the called mobile station subscriber.

17. The mobile telephone communications system as recited in claim 12, wherein the call feature server is configured to set the do-not-disturb call interception feature to apply to some calling parties but not to others.

18. The mobile telephone communications system as recited in claim 12, wherein the call feature server is configured to set the do-not-disturb call interception feature to apply to a certain period of time during the day and not at other times.

19. The mobile telephone communications system as recited in claim 12, wherein the call feature server is configured to receive designation of the time zone to which activation and deactivation of the do-not-disturb call interception feature by the called mobile station subscriber.

20. The mobile telephone communications system as recited in claim 12, wherein the mobile telephone network includes a service switching point; and the mobile telephone network is configured to establish the call path to the feature server as a trunk path from the service switching point of the mobile telephone network to the call feature server.

21. The mobile telephone communications system as recited in claim 1, wherein the call path established in step (c) is a trunk path from a service switching point of the mobile telephone communication network to the call feature server.

* * * * *